(12) United States Patent
Rolston

(10) Patent No.: US 6,215,680 B1
(45) Date of Patent: Apr. 10, 2001

(54) CIRCUIT FOR OBTAINING A WIDE DIMMING RATIO FROM A ROYER INVERTER

(75) Inventor: Walter Rolston, Overland Park, KS (US)

(73) Assignee: Garmin Corporation (TW)

( * ) Notice: Subject to any disclaimer, the term of this patent is extended or adjusted under 35 U.S.C. 154(b) by 0 days.

(21) Appl. No.: 09/577,868

(22) Filed: May 24, 2000

(51) Int. Cl.[7] .................................................. H02M 7/538
(52) U.S. Cl. ............................................. 363/133; 363/49
(58) Field of Search ................................ 363/22, 23, 49, 363/133

(56) References Cited

U.S. PATENT DOCUMENTS

| | | | |
|---|---|---|---|
| 3,563,221 | * | 2/1971 | Tada ......................................... 363/22 |
| 3,644,818 | * | 2/1972 | Paget ........................................ 363/22 |
| 4,344,122 | | 8/1982 | Jones ........................................ 363/23 |
| 4,562,382 | * | 12/1985 | Elliott ...................................... 315/219 |
| 4,982,314 | * | 1/1991 | Miki ......................................... 363/16 |
| 5,272,327 | * | 12/1993 | Mitchell et al. ........................ 315/158 |
| 5,371,754 | | 12/1994 | Berndt et al. ........................... 372/55 |
| 5,420,779 | * | 5/1995 | Payne ....................................... 363/56 |
| 5,592,367 | | 1/1997 | Sugimori et al. ....................... 363/17 |
| 5,652,479 | * | 7/1997 | LoCascio et al. ..................... 315/219 |
| 5,666,279 | | 9/1997 | Takehara et al. ...................... 363/131 |
| 5,675,220 | * | 10/1997 | Dault et al. .............................. 315/77 |
| 6,054,813 | * | 4/2000 | Takeda et al. .......................... 315/219 |

* cited by examiner

*Primary Examiner*—Jeffrey Sterrett
(74) *Attorney, Agent, or Firm*—Shook, Hardy & Bacon L.L.P.

(57) ABSTRACT

The present invention relates to a circuit for obtaining a wide dimming ratio from a Royer inverter and, more particularly, to a circuit that allows a back light to have wide dimming ratio without having unwanted current spikes that would significantly reduce the life of the back light bulbs. The invention is directed to a DC-to-AC inverter circuit for obtaining a wide dimming ratio in a display back light. The DC-to-AC inverter circuit consists of a voltage source, a Royer inverter circuit and switch circuit to turn on the Royer inverter. The Royer inverter is configured to receive a DC pulse modulated (PWM) signal that is coupled a transformer to produce an output AC PWM signal that is sent to the display back light. The configuration creates an imbalance in the Royer circuit that in turn prevents current spikes that occur when rapidly turning on the Royer inverter.

13 Claims, 5 Drawing Sheets

CIRCUIT FOR OBTAINING A WIDE DIMMING RATIO FROM A ROYER INVERTER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to a circuit for obtaining a wide dimming ratio from a Royer inverter and, more particularly, to a circuit that allows a back light in an electric device to have a wide dimming ratio without having unwanted current spikes that would significantly reduce the life of the back light bulbs.

Royer inverter circuits for converting a DC electrical signal to an AC electrical signal are well known. For example, these circuits are used when illuminating back lights used in conventional displays found in electronic devices.

Liquid crystal displays, such as those used in calculators and avionics instrumentation, are well known. Some LCD displays utilize aback light consisting of cold cathode fluorescent tubes (CCFTs) to form the display. In certain avionics scenarios, especially in dark conditions within the cockpit (such as when it is dark outside the cockpit), LCD displays become overly bright and the pilot wishes to dim the LCD displays to allow his/her eyes to adjust to the outside conditions.

Traditionally, back lights are dimmed in one of two ways. The first way is to pulse width modulate (PWM) the back light. This can deliver wide dimming ratios but larger starting transients can cause reduced bulb life and other problems such as large current transients in the system. When turn on is slowed to reduce the transients the dimming ratios are also reduced resulting in dimming ratios typically less than 30 to 1 where dimming ratios are defined as the time available for illumination divided by the actual illumination time. The second method is to reduce the current in the bulbs. This method produces limited dimming of the back light and typically results in dimming ratios of less than 20 to 1.

Expanding on the first method discussed above, a pulse width modulated (PWM) signal is used to turn on the circuit for driving the back light that establishes a period of time during which the back light may be turned on. This period is set long enough to provide a wide range of dimming. Dimming is accomplished when the back light is on for a time less than the full period available. This new way of illuminating back lights presented new problems. In particular, the PWM signal turns on the DC-to-AC inverter circuit at a fast rate that causes undesired current spikes in the inverter circuit. These current spikes carry over to the output signal of the inverter circuit and significantly shorten the life of the back light bulbs or back light CCFTs. The current spikes also propagate out of the power supply lines and can cause various system problems.

Accordingly, there exists a need for a display to have a wide dimming range without shortening the life of the back light bulbs or causing system power supply noise. The present invention fills these and other needs, and overcomes the short-comings of the prior art.

BRIEF SUMMARY OF THE INVENTION

It is an object of the present invention to provide rapid turn-on of a Royer inverter circuit without current spikes so that wide dimming of a back light is achieved.

To accomplish this and other related objects, the invention is directed to a DC-to-AC inverter circuit for obtaining a wide dimming ratio in a display back light. The DC-to-AC inverter circuit consists of a voltage source, a Royer inverter circuit and switch circuit to turn on the Royer inverter. In one embodiment, the Royer inverter is comprised of a pair of matched transistors that receive a DC pulse modulated (PWM) signal and that are coupled to a transformer to produce an output AC PWM signal that is sent to the display back light. A resistor combination is coupled to the emitter of one of the matched transistors to create an imbalance in the Royer circuit, thereby preventing or minimizing current spikes that occur when rapidly turning on the Royer inverter.

In a second embodiment, the transistors of the pair are mismatched. In particular, the transistors are selected to have sufficiently different saturation characteristics that permit rapid start-up of the circuit without excessive current spikes.

BRIEF DESCRIPTION OF THE DRAWINGS

These and other objectives and advantages of the present invention will be more readily apparent from the following detailed description of the drawings of the preferred embodiment of the invention, in which.

DETAILED DESCRIPTION OF THE INVENTION

Figure 1:
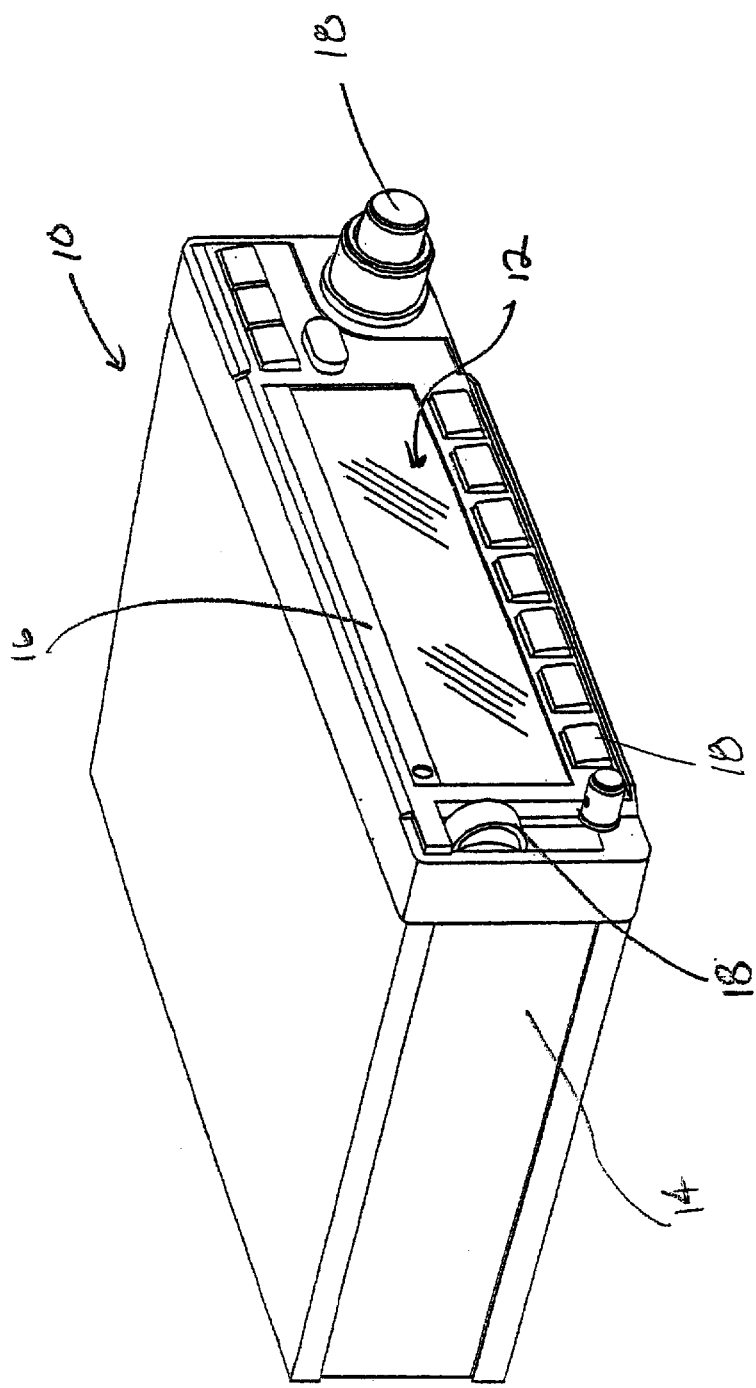
FIG. 1 is a perspective view of an electronic instrument, such as a panel mounted avionics device, equipped with a liquid crystal display in accordance with the present invention.

With reference initially to FIG. 1, numeral 10 generally designates an instrument that is used in an avionics, marine or recreational application and that is equipped with a display generally designated by numeral 12. Preferably, display 12 is a liquid crystal display, but could be of other known types of displays. The instrument includes a generally rectangular cabinet or housing 14 having a front panel 16 on which the display 12 is located. The front panel 16 is also equipped with various controls 18 including buttons, knobs and the like that would be consistent with an electrical instrument having such a display.

Figure 2:
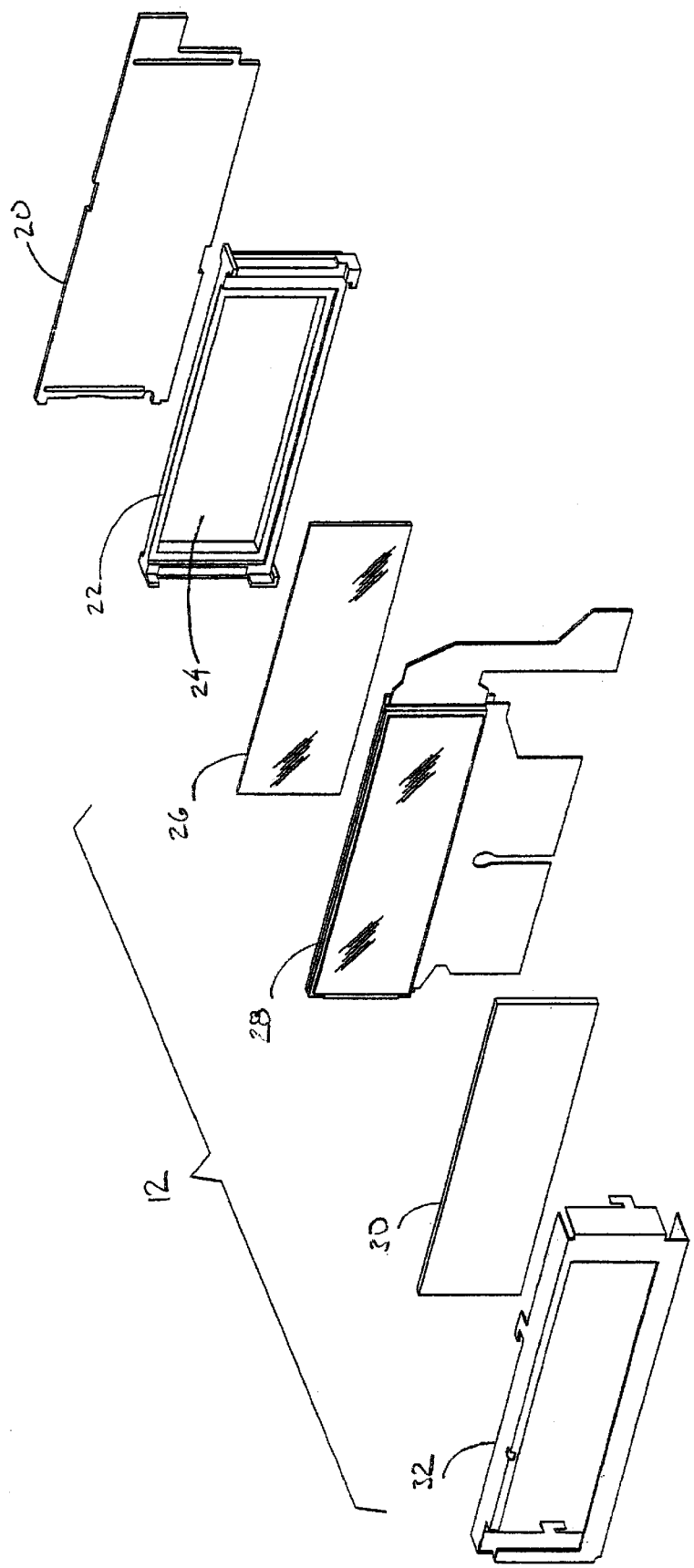
FIG. 2 is an exploded perspective view of the parts of the display.

The preferred physical construction of display 12 is best shown in FIG. 2. A printed circuit board 20 is connected with a light block or back light 22 by means of a plurality of standard connections. The light block (back light) 22 contains a plurality of cold cathode flourescent tubes (CCFTs) 24 that emit light when energized. A special diffuser panel 26 is disposed on the front face of the CCFT back light 22. The diffuser 26 is constructed such that it is able to transmit through it the light that is emitted by the back light 22. Other arrangements or components may be employed and the diffuser 26 is not critical to the present invention.

The display 12 also includes a liquid crystal display (LCD) module 28 that preferably takes the form of a transmissive or backlit thin film transistor (TFT) display, but could also include double super twist nematic (DSTN) and supertwist nematic displays among others. The LCD module 28 is connected with the board 20 through standard electrical connections and is controlled in a manner to be subsequently described. An anti-reflective lens 30 covers the front face of the LCD module 28 and a suitable frame 32 is provided to connect the components illustrated in FIG. 2 together as a single unit that is installed in the cabinet or housing 14 of instrument 10. The components in FIG. 2 are constructed and shaped to be assembled together by crimping and twisting the various tabs and other parts as would be readily understood.

Figure 3:
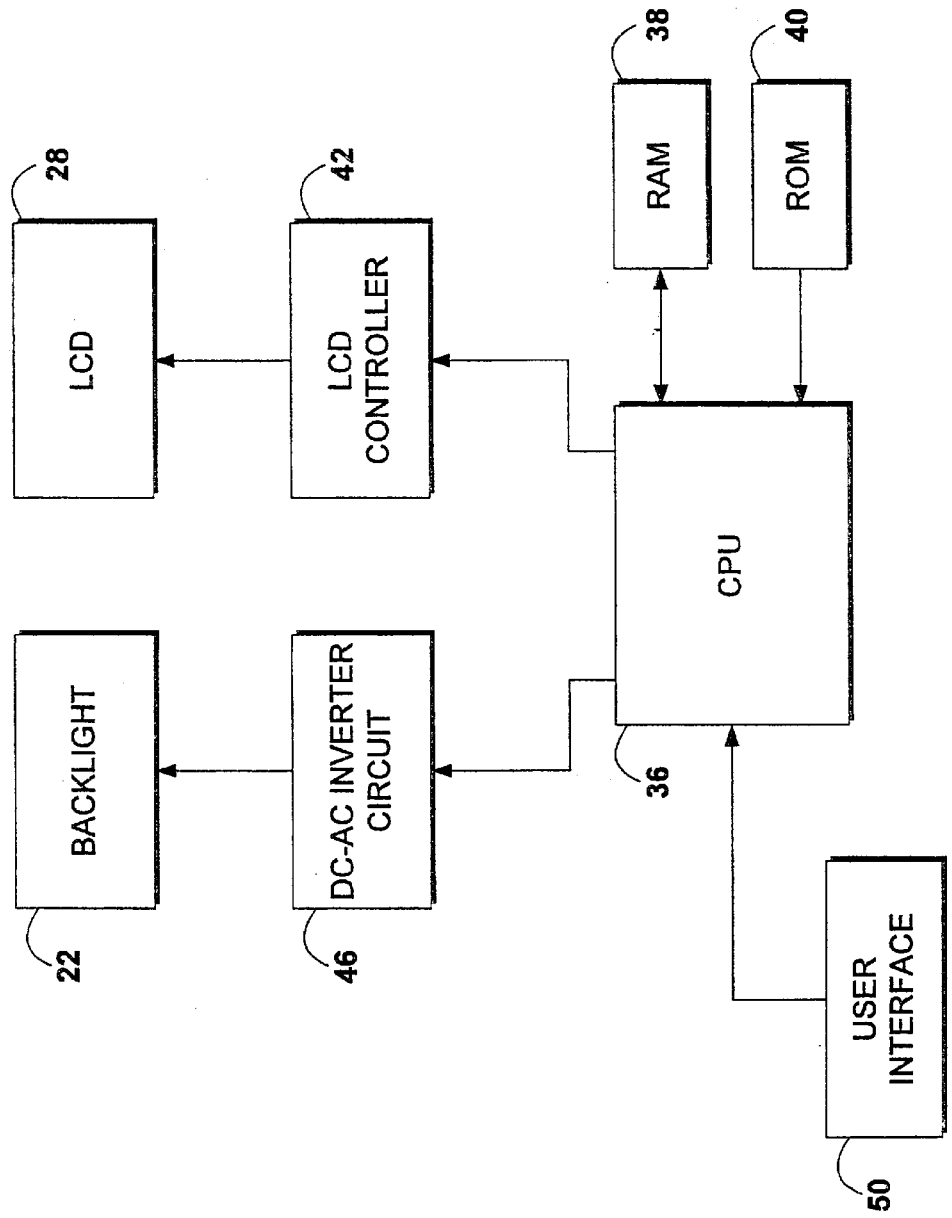
FIG. 3 is a functional block diagram of the principle electronic components used in the display of the present invention.

FIG. 3 is functional block diagram of the principle electronic components used to operate the display. A central processing unit (CPU) 36 is associated with a random access memory (RAM) 38 and a read only memory (ROM) 40. A LCD controller 42 actuates pixels (liquid crystals) of the LCD module 28 under the control of the CPU 36. One method for controlling and refreshing pixel and display data is disclosed in U.S. patent application Ser. No. 09/354,886 which is incorporated herein by reference. In response to a pulse width modulated (PWM) signal from the CPU 36, a DC to AC inverter circuit 46 preferably converts the direct current PWM signal into a corresponding alternating current PWM signal to activate the back light 22. Preferably, the DC PWM signal would have square wave like properties with a peak of approximately 5 volts and have a turn on frequency of approximately 60 Hz. As would be understood, other methods for refreshing the LCD module 28 and generating the back light signal exist and would be consistent with this invention. In accordance with the present invention, a user interface 50 receives operator input through traditional input devices such as knobs, dials, rheostats and the like for adjusting the brightness of the back light 22. The CPU 36 receives the input data and stores this information in the RAM 38. A preset display refresh frequency and the back light frequency is stored in ROM 40.

Figure 4:
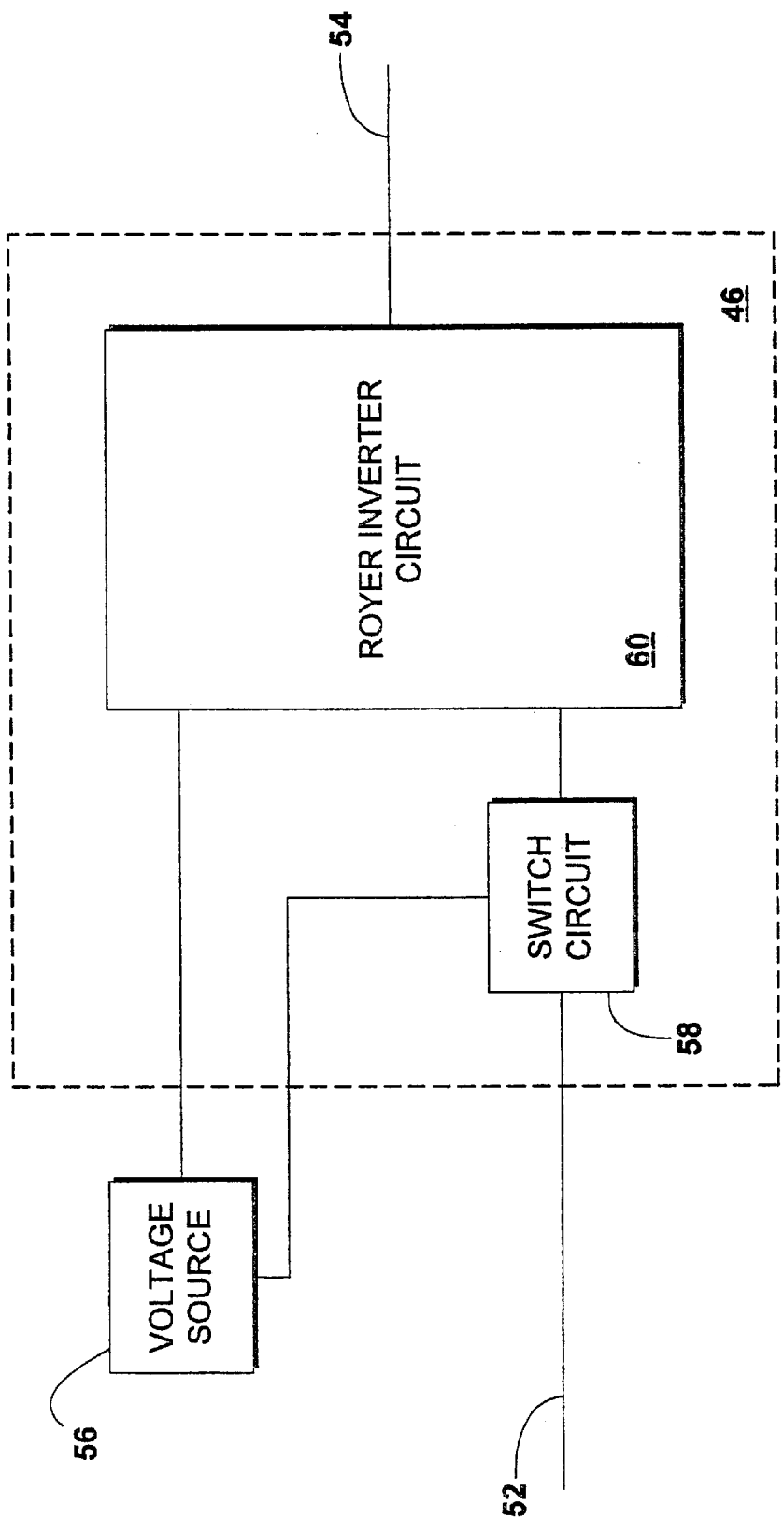
FIG. 4 is a schematic diagram illustrating the basic electronic components of the DC-to-AC inverter circuit of the present invention.

FIG. 4 is a schematic block diagram illustrating the basic electronic components of the DC to AC inverter circuit 46. The DC to AC inverter circuit 46 comprises an input 52 to receive the DC PWM signal from the CPU 36 (FIG. 3) and an output 54 to send the AC PWM signal to the back light 22 (FIG. 3). Contained within the DC to AC inverter circuit 46 is a DC voltage source 56, switch circuit 58 and a Royer inverter circuit 60. The switch circuit 58 receives the DC PWM signal 46 and determines if it is high or low. The DC PWM signal is preferably a square wave signal ranging from zero to 5 volts. The switch circuit 58 turns the Royer inverter circuit 60 on and off at the same frequency of the DC PWM signal. The voltage source 56 provides a constant voltage to facilitate operation of both the switch circuit 58 and the Royer inverter circuit 60.

Figure 5:
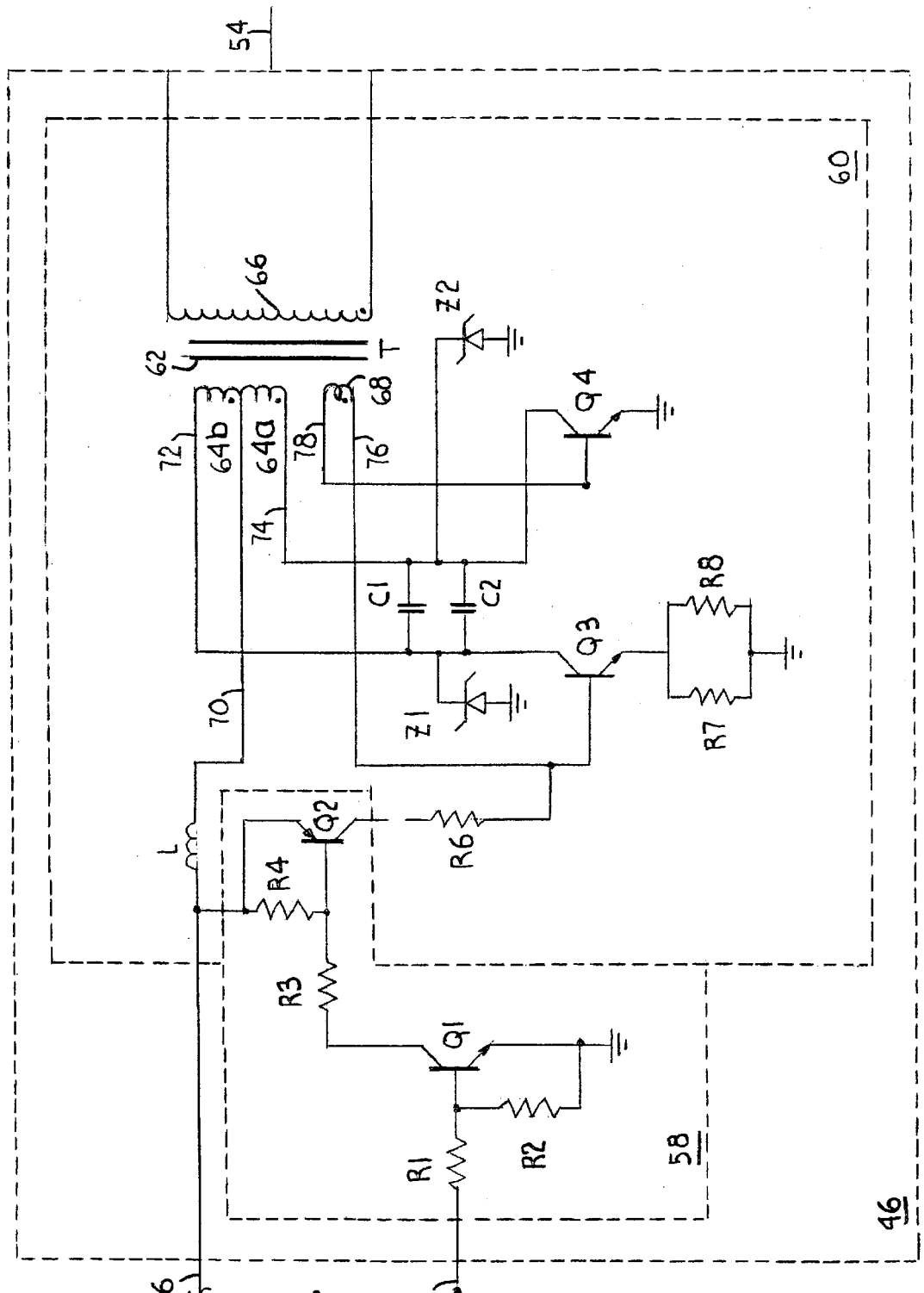
FIG. 5 is a schematic diagram illustrating the electrical circuit elements of the DC-to-AC inverter, including the Royer inverter circuit of the present invention.

FIG. 5 is a schematic diagram illustrating the electronic circuit elements of the DC to AC inverter circuit. The switch circuit 58 includes transistors Q1 and Q2 configured with resistors R1, R2, R3, and R4 such that when an input DC PWM signal goes high, it triggers the base of transistor Q1 and thereby turns on the Royer inverter circuit 60. The base of npn transistor Q1 is coupled to the input 52 via resistor R1 and is further coupled to its emitter via resistor R2. The emitter of transistor Q1 is grounded and coupled the terminal end of resistor R2. The emitter of pnp transistor Q2 is coupled the constant voltage source 56 and to its base via resistor R4. The base of Q2 is further coupled to the collector of Q1 via resistor R3. This configuration allows a 0 to 5V DC PWM signal to turn on and off the voltage source 56 that feeds the Royer inverter circuit 60 via resistor and R6.

In the present invention, the Royer inverter circuit 60 includes a transformer T with a core 62 having a primary winding 64, secondary winding 66 and a transistor base winding 68. The primary winding 64 is provided with a center tap 70 that divides the primary winding into two electrically identical halves, 64a and 64b, and that is coupled to a constant voltage source 56 through inductor L. In a preferred embodiment, transistors Q3 and Q4 are matched and their collectors are coupled to the primary winding ends 72 and 74, respectively. The emitter on Q3 is coupled to resistors R7 and R8 and the emitter on Q4 is connected to ground. The capacitors C1 and C2 help set the Royer oscillating frequency. Zener diodes Z1 and Z2 protect the circuit components, particularly, Q3 and Q4 from turn-on and turn-off transients. The first base winding lead 76 is coupled to the base of Q3 with the second base winding lead 78 coupled to the base of Q4. With resistors R7 and R8 coupled to transistor Q3, this configuration creates a mismatched transistor pair and, in conjunction with impedance L, begins the oscillation in the Royer inverter circuit. Values for resistors R7 and R8 and inductor L are chosen to allow rapid start-up of the DC-to-AC inverter circuit without undesired current spikes through the transformer T. As would be understood, actual values for the above mentioned electrical components would differ for various applications and would be known by those skilled in the art.

In another embodiment, the preferred Royer inverter circuit 60 described above is altered to provide transistors Q3 and Q4 that are mismatched so that they have sufficiently different saturation characteristics. The values for Q3 and Q4 are chosen to allow rapid start-up of the DC-to-AC inverter circuit without the undesired current spikes flowing to the back light. Thus, resistors R7 and R8 are no longer needed because they would not be required to achieve a mismatched transistor pair.

In operation, before the DC-to-AC inverter circuit 46 receives an input DC pulse width modulated (PWM) signal from the CPU 36, the Royer inverter circuit 60 is off and does not generate the AC PWM signal to the back light 22. As the DC PWM signal goes high, the switch circuit 58 is activated, as described below, and sends the base current signal to the Royer inverter circuit 60. When the DC PWM signal remains high, the Royer inverter circuit 60 begins operation, as will be subsequently discussed, by oscillating and outputting an AC PWM signal via the secondary winding 66 of transformer T to turn on the back light 22.

When the DC PWM signal switches from low to high at input 52, both transistors Q1 and Q2 in the switch circuit 58 turn on. This allows the voltage source 56 to provide the necessary base current to turn on transistors Q3 and Q4. When the PWM signal goes low, transistors Q1 and Q2 turn off resulting in shutting off the base current driving transistors Q3 and Q4.

As the switch circuit 58 sends current to the Royer inverter circuit 60, turn on of the Royer inverter circuit 60 occurs very rapidly. The switch circuit 58 sends base current that drives transistors Q3 and Q4. The base current driving Q3 and Q4 in conjunction with inductor L allows current to flow through the primary winding 64. Because of the resistor combination R7 and R8 coupled to transistor Q3, transistor Q4 has a greater gain characteristic and is turned on before transistor Q3. As current begins flowing through transistor Q4, most of the current in the inductor L flows in primary winding 64a. The current in winding 64a causes the flux density within the core 62 to increase so that the base winding 68 develops a voltage and by this time, Q4 is saturated. The size of inductor L determines the ramp voltage across winding 64a.

The full amplitude of voltage source 56 is rapidly applied across primary winding 64a. As the flux increases, the flux gets large enough to reverse the voltage on the base winding 68 that drives transistor Q3 into saturation and allows current to flow through the collector of transistor Q3 and primary winding 64b. The Royer inverter circuit 60 has thus begun oscillating and will continue to do so until the DC PWM signal received at the switch circuit 58 goes low. Oscillation frequency is dependant upon a combination of primary and secondary inductances and capacitances. In the preferred embodiment, this oscillation frequency ranges from 20 to 70 kHz. As the Royer inverter circuit 60 oscillates, transformer T steps up the resulting AC PWM voltage signal and outputs it via the secondary winding 66 of transformer T to turn on the back light 22. Preferably, the AC PWM signal has a peak value sufficient to ignite the CCF tubes that make up the display.

When transistors Q3 and Q4 are perfectly matched, the current flowing through the primary winding 64 and their collectors will spike through the transformer T at rapid start-up. Even though transistors Q3 and Q4 are matched, oscillation will still occur because of small mismatches within the transistors and circuits driven. Resistors R7 and R8 are added to the emitter of transistor Q3 to create a current and flux imbalance through the transformer T that thereby negates the current spike.

From the foregoing, it will be seen that this invention is one well adapted to attain all the ends and objects hereinabove set forth together with other advantages that are inherent to the structure.

It will be understood that certain features and subcombinations are of utility and may be employed without reference to other features and subcombinations. This is contemplated by and is within the scope of the claims.

What is claimed is:

1. A DC-to-AC inverter circuit for obtaining a wide dimming ratio in a display back light, said DC-to-AC inverter circuit adapted to receive power from a power source, said DC-to-AC inverter circuit comprising:

an inverter circuit, wherein said inverter circuit further comprises:

a first transistor having a collector, base and emitter;

a second transistor having a collector, base and emitter;

a resistor coupled to said emitter of only one of said first transistor and second transistor; and a transformer having a base winding having a first lead coupled to said base of said first transistor and a second lead coupled to said base of said second transistor, a primary winding having a first lead coupled to said collector of said first transistor, a second lead coupled to said collector of said second transistor, and a center-tap lead coupled to said power source, and a secondary winding coupled to said back light.

2. The DC-to-AC inverter circuit of claim 1, wherein said inverter circuit comprises a Royer inverter circuit.

3. The DC-to-AC inverter circuit of claim 2, further comprising a switch circuit coupled to said power source and said Royer inverter circuit to turn on said Royer inverter circuit.

4. The DC-to-AC inverter circuit of claim 1, wherein said inverter circuit has an inductor coupled between said power source and said center-tap lead of said primary winding of said transformer.

5. The DC-to-AC inverter circuit of claim 1, wherein said inverter circuit includes a capacitor and zener diode circuit coupled between said collectors of said first and second transistors and said first and second leads of said primary winding.

6. The DC-to-AC inverter circuit of claim 1, wherein said resistor is of sufficient value to prevent current spikes in said DC-to-AC inverter circuit during turn-on.

7. The DC-to-AC inverter circuit of claim 1, wherein said resistor comprises at least two resistors connected in series with each other.

8. The DC-to-AC inverter circuit of claim 1, wherein said resistor comprises at least two resistors connected in parallel with each other.

9. A DC-to-AC inverter circuit for obtaining a wide dimming ratio in a display back light, said DC-to-AC inverter circuit adapted to receive power from a power source, said DC-to-AC inverter circuit comprising:

an inverter circuit, wherein said inverter circuit further comprises:

a first transistor having a collector, base, emitter and saturation characteristic;

a second transistor having a collector, base, emitter, and saturation characteristic, wherein said second transistor saturation characteristic is different from said first transistor saturation characteristic and, wherein said difference in saturation characteristic between said first transistor and second transistor is of sufficient value to prevent current spikes in said DC-to-AC inverter circuit during turn-on; and a transformer having a base winding having a first lead coupled to said base of said first transistor and a second lead coupled to said base of said second transistor, a primary winding having a first lead coupled to said collector of said first transistor, a second lead coupled to said collector of said second transistor, and a center-tap lead coupled to said power source, and a secondary winding coupled to said back light.

10. The DC-to-AC inverter circuit of claim 9, wherein said inverter circuit comprises a Royer inverter circuit.

11. The DC-to-AC inverter circuit of claim 10, further comprising a switch circuit coupled to said power source and said Royer inverter circuit to turn on said Royer inverter circuit.

12. The DC-to-AC inverter circuit of claim 9, wherein said inverter circuit includes a capacitor and zener diode circuit coupled between said collectors of said first and second transistors and said first and second leads of said primary winding.

13. The DC-to-AC inverter circuit of claim 9, wherein said inverter circuit has an inductor coupled between said power source and said center-tap lead of said primary winding of said transformer.

* * * * *